US009824365B2

(12) United States Patent
Bradley et al.

(10) Patent No.: US 9,824,365 B2
(45) Date of Patent: **\*Nov. 21, 2017**

(54) METHODS, APPARATUSES AND COMPUTER PROGRAM PRODUCTS FOR MEASURING VEHICLE CARBON FOOTPRINT

(71) Applicant: United Parcel Service of America, Inc., Atlanta, GA (US)

(72) Inventors: David L. Bradley, Alpharetta, GA (US); John A. Olsen, III, Cumming, GA (US); Mark J. Davidson, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,036

(22) Filed: Dec. 9, 2015

(65) Prior Publication Data

US 2016/0098729 A1    Apr. 7, 2016

Related U.S. Application Data

(63) Continuation of application No. 13/399,606, filed on Feb. 17, 2012, now Pat. No. 9,248,790.

(51) Int. Cl.
*G01F 9/00* (2006.01)
*G06F 7/00* (2006.01)
(Continued)

(52) U.S. Cl.
CPC ....... *G06Q 30/018* (2013.01); *B60R 16/0236* (2013.01); *G01F 9/001* (2013.01); *G06Q 10/00* (2013.01); *G01F 9/023* (2013.01)

(58) Field of Classification Search
CPC .. B60R 16/0236; G06Q 10/00; G06Q 30/018; G01F 9/001; G01F 9/023
(Continued)

(56) References Cited

U.S. PATENT DOCUMENTS 7,580,808 B2   8/2009  Bos
7,715,961 B1   5/2010  Kargupta
(Continued)

FOREIGN PATENT DOCUMENTS

WO   WO 2008/032075 A2   3/2008
WO   WO 2009/125178 A2   10/2009

OTHER PUBLICATIONS

Canadian Intellectual Property Office, Requisition by the Examiner for Application No. 2,863,315, Dec. 15, 2015, 4 pages, Canada.
(Continued)

*Primary Examiner* — Tyler J Lee
(74) *Attorney, Agent, or Firm* — Alston & Bird LLP (57) ABSTRACT

Systems, methods, apparatuses, and computer program products are provided for determining carbon emissions of one or more vehicles. For instance, in one example embodiment, an apparatus may calculate miles traveled by the vehicles along a predefined route and may calculate a fuel usage of the vehicles for traveling along the route to obtain one or more fuel values. The apparatus may also analyze data indicating the miles traveled and the fuel values to determine fuel efficiency values corresponding to the vehicles traveling the route. The apparatus may also determine an estimate of an amount of carbon emissions for each of the vehicles based in part on applying at least one carbon emission value to respective fuel values associated with corresponding determined fuel efficiency values.

28 Claims, 6 Drawing Sheets

(51) Int. Cl.
  *B60R 16/023* (2006.01)
  *G06Q 10/00* (2012.01)
  *G01F 9/02* (2006.01)
  *G06Q 30/00* (2012.01)
(58) Field of Classification Search
  USPC .......................................................... 701/123
  See application file for complete search history.

(56) References Cited

U.S. PATENT DOCUMENTS

| | | | |
|---|---|---|---|
| 8,131,456 | B2 | 3/2012 | Mahalingaiah et al. |
| 8,280,646 | B2 | 10/2012 | Seidel |
| 8,498,818 | B1 | 7/2013 | Jones, Jr. et al. |
| 2008/0125958 | A1 | 5/2008 | Boss et al. |
| 2008/0154671 | A1 | 6/2008 | Delk |
| 2009/0069999 | A1 | 3/2009 | Bos |
| 2009/0292617 | A1 | 11/2009 | Sperling et al. |
| 2010/0070316 | A1 | 3/2010 | Lieberman et al. |
| 2010/0076878 | A1 | 3/2010 | Burr et al. |
| 2010/0077020 | A1 | 3/2010 | Paloheimo et al. |
| 2010/0280734 | A1 | 11/2010 | Brinton et al. |
| 2011/0056185 | A1 | 3/2011 | Bradley et al. |
| 2011/0071721 | A1 | 3/2011 | Gilfillan et al. |
| 2011/0099022 | A1 | 4/2011 | Stochniol |
| 2011/0184784 | A1 | 7/2011 | Rudow et al. |
| 2011/0258044 | A1 | 10/2011 | Kargupta |
| 2011/0270486 | A1 | 11/2011 | Stevens et al. |
| 2012/0143787 | A1 | 6/2012 | Needham |
| 2012/0226424 | A1 | 9/2012 | Adams |
| 2013/0204471 | A1 | 8/2013 | O'Connell et al. |
| 2013/0218446 | A1 | 8/2013 | Bradley et al. |

OTHER PUBLICATIONS

State Intellectual Property Office of the P.R.C., First Office Action for Application No. 201280068427.4, Dec. 4, 2015, 20 pages, China.
State Intellectual Property Office of the P.R.C., Second Office Action for Application No. 201280068427.4, Jul. 19, 2016, 7 pages, China.
European Patent Office, Extended European Search Report for Application No. 12791876.1, Jul. 2, 2015, 7 pages, Germany.
International Preliminary Examining Authority, International Preliminary Report on Patentability for International Application No. PCT/US2012/60357, mailed May 19, 2014, 8 pages, United States Patent and Trademark Office, USA.
International Preliminary Examining Authority, Written Opinion (second) for International Application No. PCT/US2012/60357, mailed Feb. 7, 2014, 7 pages, United States Patent and Trademark Office, USA.
International Searching Authority, International Search Report and Written Opinion for International Application No. PCT/US2012/60357, mailed Apr. 5, 2013, 10 pages, United States Patent and Trademark Office, USA.
State Intellectual Property Office of the P.R.C., First Office Action for Application No. 201280068427.4, Dec. 4, 2015, 20 pages.
State Intellectual Property Office of the P.R.C., Search Report for Application No. 201280068427.4, Nov. 25, 2015, 5 pages.
U.S. Appl. No. 12/562,431, entitled, "Systems and Methods for Calculating Emissions Resulting From Transporting a Shipment," filed Sep. 18, 2009.
United States Patent and Trademark Office, Notice of Allowance for U.S. Appl. No. 13/399,606, Apr. 17, 2015, 14 pages, U.S.A.
United States Patent and Trademark Office, Notice of Allowance for U.S. Appl. No. 13/399,606, Sep. 10, 2015, 9 pages, U.S.A.
United States Patent and Trademark Office, Office Action for U.S. Appl. No. 13/399,606, Jul. 31, 2013, 16 pages, U.S.A.
United States Patent and Trademark Office, Office Action for U.S. Appl. No. 13/399,606, Nov. 13, 2013, 13 pages, U.S.A.
United States Patent and Trademark Office, Office Action for U.S. Appl. No. 13/399,606, Aug. 8, 2014, 13 pages, U.S.A.
United States Patent and Trademark Office, Office Action for U.S. Appl. No. 13/399,606, Dec. 29, 2014, 16 pages, U.S.A.
Canadian Intellectual Property Office, Requisition by the Examiner for Application No. 2,863,315, Dec. 29, 2016, 4 pages, Canada.

METHODS, APPARATUSES AND COMPUTER PROGRAM PRODUCTS FOR MEASURING VEHICLE CARBON FOOTPRINT

CROSS-REFERENCE TO RELATED APPLICATIONS

This application is a continuation of U.S. application Ser. No. 13/399,606, filed Feb. 17, 2012, the contents of which are hereby incorporated herein in its entirety by reference.

TECHNOLOGICAL FIELD

Embodiments of the invention relate generally to measuring carbon footprint and more generally relate to methods, apparatus and computer program products for measuring the carbon footprint of one or more vehicles.

BACKGROUND

As awareness of environmental issues has grown, logistics, supply chain and shipping customers have become increasing concerned about the impact of their transportation activities on the environment. In order to reduce the carbon footprint of transportation companies, carbon pricing may be imposed on the transportation companies based on the carbon emissions usage of the transportation companies as an incentive to reduce carbon emissions. In this regard, some transportation companies (e.g., shipping companies) are now requesting reports on the carbon footprint of their vehicles delivering shipments, which they may use as gauges for purchasing carbon credits and for monitoring their environmental impact.

Currently, carbon emissions sources and offset entities may issue carbon credits to transportation companies based on the amount of carbon emissions usage reported to the carbon emission sources and offset entities. At present, measurements associated with carbon emissions of vehicles are typically calculated based in part on some human interaction. For example, an individual such as, for example, a driver of a vehicle may input data to a carbon emissions system indicating the amount of fuel that was put in a vehicle and the number of miles that the driver drove the vehicle, etc. and this data input by the driver may be utilized to calculate the carbon emissions of a vehicle.

Relying on user input of data may result in errors and inefficiencies in calculating carbon emissions of vehicles. Errors in calculating carbon emissions may result in inaccurate carbon offsets that may need to be paid.

Accordingly, a need exists for an improved system and method for calculating the carbon emissions resulting from transporting shipments through a transportation network.

BRIEF SUMMARY

In general, embodiments of the present invention provide systems, methods, apparatuses and computer program products for automated data collection for measuring carbon emissions of one or more vehicles. An example embodiment may enable carbon emissions measurement data to be reported to a carbon emissions source and offset entity, for example, in a more reliable manner based in part on automating the carbon emissions calculations with minimal or no user input required.

In one example embodiment, a method for determining the carbon emissions of one or more vehicles is provided. The method may include calculating miles traveled by one or more vehicles along a predefined route and calculating the fuel usage of the vehicles for traveling along the route to obtain one or more fuel values. The method may also include analyzing data indicating the miles traveled and the fuel values to determine fuel efficiency values corresponding to the vehicles traveling the route. The method may further include determining an estimate of an amount of carbon emissions for each of the vehicles based in part on applying at least one carbon emission value to respective fuel values associated with corresponding determined fuel efficiency values.

In another example embodiment, an apparatus for determining the carbon emissions of one or more vehicles is provided. The apparatus may include a processor and a memory including computer program code. The memory and the computer program code are configured to, with the processor, cause the apparatus to at least calculate miles traveled by one or more vehicles along a predefined route and calculate the fuel usage of the vehicles for traveling along the route to obtain one or more fuel values. The memory and the computer program code may further cause the apparatus to analyze data indicating the miles traveled and the fuel values to determine fuel efficiency values corresponding to the vehicles traveling the route. The memory and the computer program code may further cause the apparatus to determine an estimate of an amount of carbon emissions for each of the vehicles based in part on applying at least one carbon emission value to respective fuel values associated with corresponding determined fuel efficiency values.

In another example embodiment, a computer program product for determining the carbon emissions of one or more vehicles is provided. The computer program product includes at least one computer-readable storage medium having computer-executable program code instructions stored therein. The computer executable program code instructions may include program code instructions configured to calculate miles traveled by one or more vehicles along a predefined route and calculate the fuel usage of the vehicles for traveling along the route to obtain one or more fuel values. The program code instructions may also include analyzing data indicating the miles traveled and the fuel values to determine fuel efficiency values corresponding to the vehicles traveling the route. The program code instructions may also determine an estimate of an amount of carbon emissions for each of the vehicles based in part on applying at least one carbon emission value to respective fuel values associated with corresponding determined fuel efficiency values.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 5 is a diagram of a user interface according to an example embodiment of the invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, fuel efficiency of a vehicle(s) may be designated as a ratio of distance travelled per unit of fuel consumed and may, but need not, be expressed as miles per gallon (MPG). Additionally, as referred to herein, telematics may, but need not, denote the integrated use of informatics and telecommunications for usage in a vehicle(s) and/or for control of vehicles during transportation.

As referred to herein, carbon pricing may refer to a price or cost imposed on carbon emissions such as, for example, carbon emissions of one or more vehicles. In addition, as referred to herein, a carbon offset may, but need not, denote a carbon price imposed on an entity for purchase of carbon reductions elsewhere such as, for example, by other entities or institutions in order to offset an entity's own carbon emissions, or a carbon tax for exceeding an acceptable level of carbon emissions.

In some example embodiments of the present invention, carbon emissions for a vehicle(s) and/or shipment of a package(s) may be determined according to techniques described in application Ser. No. 12/562,431, the contents of which are incorporated herein in their entirety by reference.

I. Exemplary System Architecture

Figure 1:
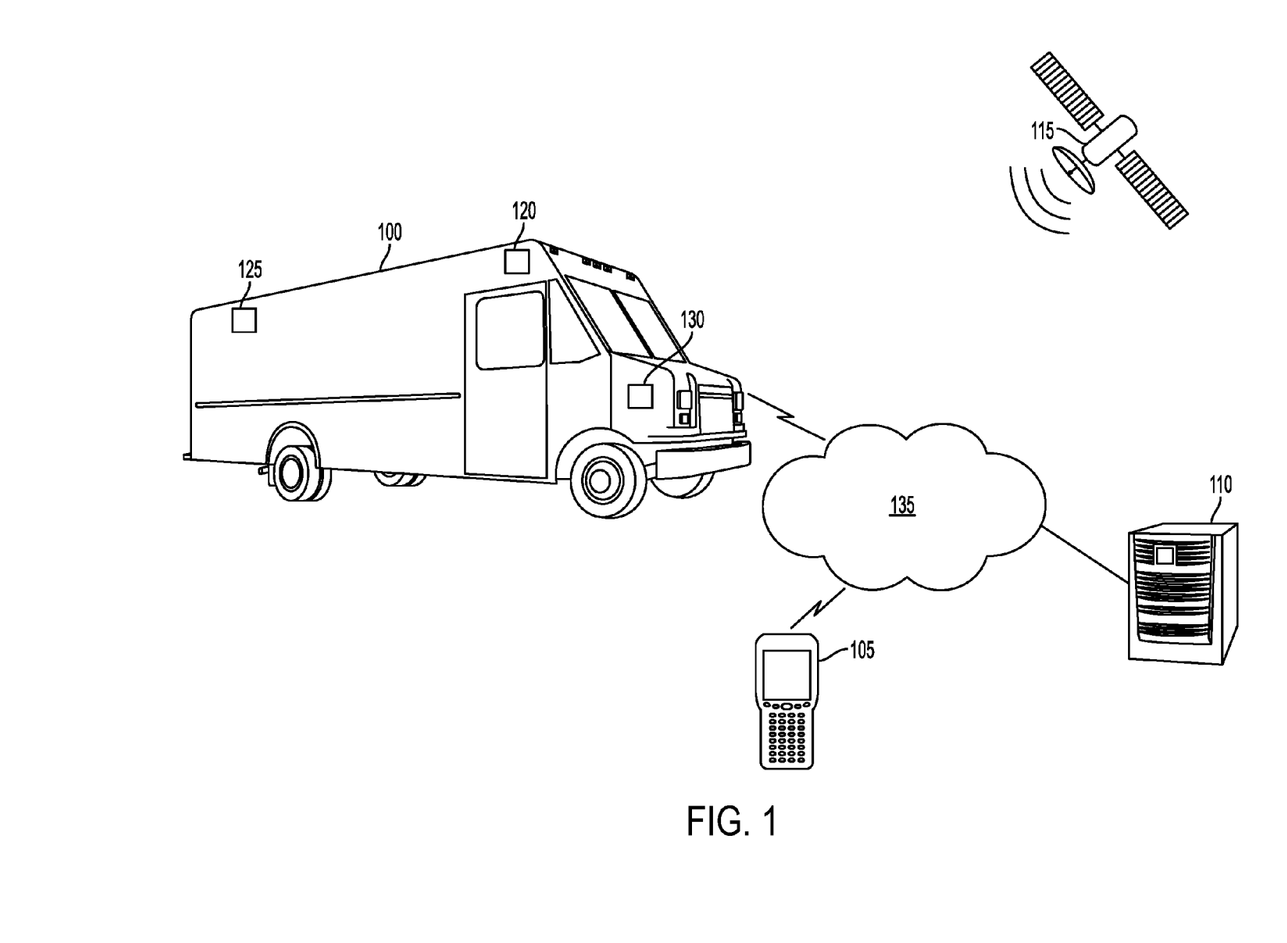
FIG. 1 is a diagram of a system that can be used to practice various example embodiments of the invention.

FIG. 1 provides an illustration of a system that can be used in conjunction with various embodiments of the present invention. As shown in FIG. 1, the system may include one or more vehicles 100, one or more portable devices 105, one or more servers 110, one or more Global Positioning System (GPS) satellites 115, one or more location sensors 120, one or more vehicle sensors 125, one or more data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, a vehicle 100 may include one or more location sensors 120, one or more vehicle sensors 125, one or more data collection devices 130, and/or the like.

Figure 2:
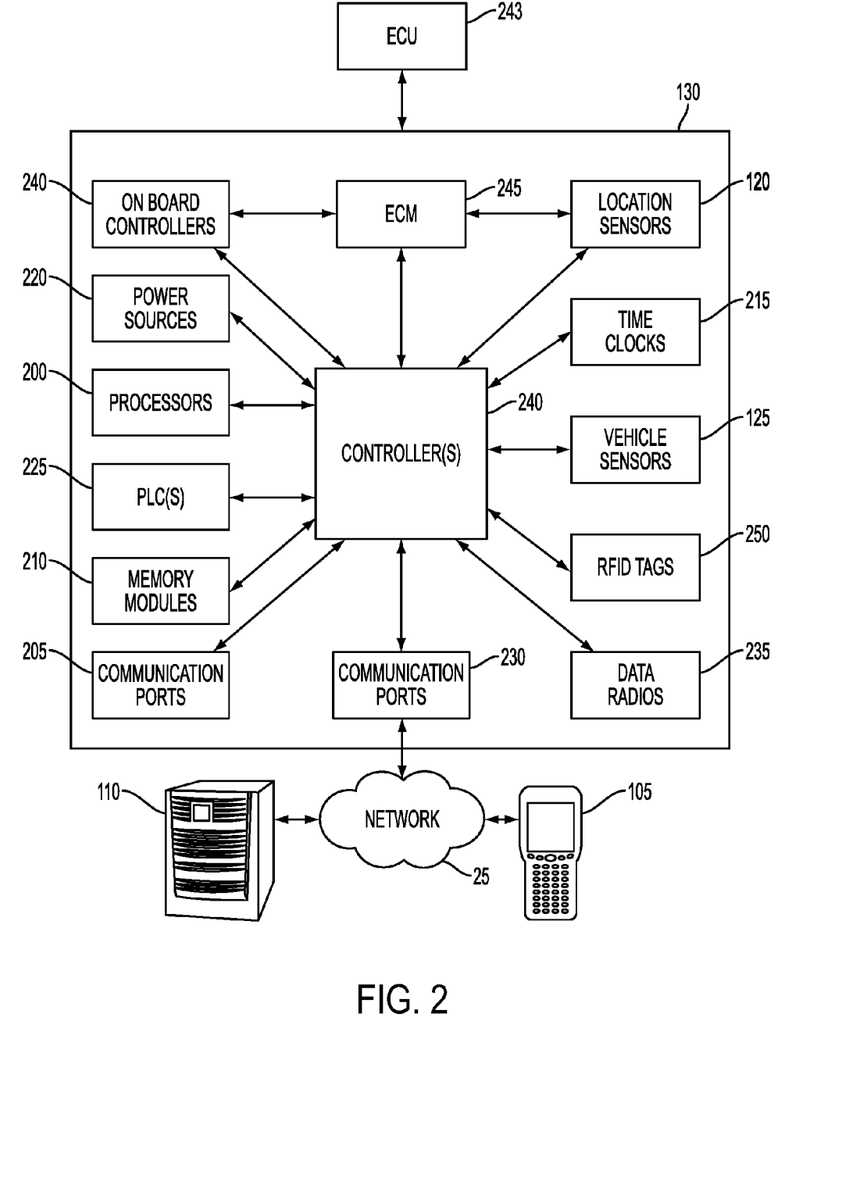
FIG. 2 includes a diagram of a data collection device that may be used in association with certain example embodiments of the invention.

Reference is now made to FIG. 2, which provides a block diagram of an exemplary data collection device 130. In one embodiment, the data collection device 130 may include, be associated with, or be in communication with one or more power sources 220, one or more real-time clocks 215, one or more processors 200, one or more memory modules 210 (e.g., removable and/or non-removable memory, volatile and/or non-volatile memory, and transitory and/or non-transitory memory), one or more databases (not shown). In an example embodiment, the memory modules 210 may include, for example, volatile and/or non-volatile memory and the memory modules 210 may be electronic storage devices (e.g., a computer readable storage medium(s)) comprising gates configured to store data (e.g., bits) that may be retrievable by a machine (e.g., a computing device like controller(s) 240, ECM 245).

In an example embodiment, the memory modules 210 (e.g., memory devices) may be a tangible memory device that is not transitory. The data collection device may also include one or more programmable logic controllers (PLC(s)) 225, a J-Bus protocol architecture, and one or more electronic control modules (ECM) 245. For example, the ECM 245 (e.g., a processor), which may be a scalable and subservient device to the data collection device 130, may have data processing capability to decode and store analog and digital inputs from vehicle systems and sensors. The ECM 245 may further have data processing capability to collect and provide telematics data to the J-Bus (which may allow transmission to the data collection device 130), and output standard vehicle diagnostic codes when received from a vehicle's J-Bus-compatible on-board controllers 240 and/or sensors.

Additionally, in one embodiment, the data collection device 130 may include, be associated with, or be in communication with one or more radio frequency identification (RFID) tags 250. In one embodiment, the one or more RFID tags 250 may include active RFID tags, each of which may comprise at least one of the following: (1) an internal clock; (2) a memory; (3) a microprocessor; and (4) at least one input interface for connecting with sensors located in the vehicle 100 and/or the data collection device 130. In another embodiment, the RFID tags 250 may be passive RFID tags.

In one embodiment, the data collection device 130 may include, be associated with, or be in communication with one or more location-determining devices and/or one or more location sensors 120 (e.g., Global Navigation Satellite System (GNSS) sensors). The one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's driver and with various communication points (e.g., cellular towers or Wi-Fi access points) positioned at various locations throughout a geographic area to monitor the location of the vehicle 100 and/or its driver. The one or more location sensors 120 may be used to receive latitude, longitude, altitude, geocode, course, position, time, and/or speed data (e.g., telematics data). The one or more location sensors 120 may also communicate with the server 110, the data collection device 130, and/or a similar network entity.

In one embodiment, the data collection device 130 may include, be associated with, or be in communication with one or more vehicle sensors 125. In one embodiment, the vehicle sensors 125 may include vehicle sensors, such as engine, fuel, odometer, hubometer, tire pressure, location, weight, emissions, door, braking, transmission and speed sensors. Thus, the one or more vehicle sensors 125 may collect speed data, emissions data, RPM data, tire pressure data, oil pressure data, seat belt usage data, distance data, fuel data, and/or idle data (e.g., telematics data). The vehicle sensors 125 may also include environmental sensors, such as air quality sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data, carbon dioxide ($CO_2$) and/or meteorological data.

In one embodiment, the data collection device 130 may include, be associated with, or be in communication with one or more communication ports 230 for receiving data from various sensors (e.g., via a CAN-bus), one or more communication ports 205 for transmitting data, and one or more data radios 235 for communication with a variety of communication networks. Embodiments of the communication port 230 may include an Infrared Data Association (IrDA) communication port, a data radio, and/or a serial port. The communication port 230 may receive instructions for the data collection device 130. These instructions may be specific to the vehicle 100 in which the data collection device 130 is installed, specific to the geographic area in which the vehicle 100 will be operated, and/or specific to the function the vehicle 100 serves within the fleet. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via these communication standards and protocols, the data collection device 130 can communicate with various other entities, such as the portable device 105 and/or the server 110 via a network 25. As will be recognized, the data collection device 130 may transmit the telematics data to the portable device 105 and/or the server 110 via one of several communication methods.

In some example embodiments, the ECM 245 may determine the mileage and/or a fuel burn of vehicle 100. For instance, in an example embodiment, the ECM 245 may communicate with an engine control unit (ECU) 243 that manages an engine's operation and may receive one or more codes to determine mileage and/or fuel burn. The codes may include, but are not limited to, a specific parameter number (SPN) 245 code, a SPN 250 code and any other suitable codes. The SPN 245 code may be associated with data indicating the total number of miles maintained for the lifetime (also referred to herein as lifetime miles) of a vehicle (e.g., vehicle 100). The SPN 250 may be associated with data indicating the total fuel burn over the lifetime (also referred to herein as lifetime fuel) of a vehicle (e.g., vehicle 100).

In an instance in which a vehicle (e.g., vehicle 100) leaves a location (e.g., a building (e.g., a shipping center)) for transporting/delivering items (e.g., packages), the ECU 243 may provide the ECM 245 with the SPN codes 245, 250 to enable the ECM 245 to identify the current miles (also referred to as beginning miles) at the beginning of the delivery and current fuel burn (also referred to herein as beginning fuel burn) at the beginning of the delivery. Additionally, upon the vehicle returning to the location (e.g., the building (e.g., the shipping center)) or a destination location (e.g., a delivery destination) the ECM 245 may receive additional SPN codes 245, 250, from the ECU 243, to determine the miles (also referred to herein as ending miles) at the end of the delivery and the fuel burn (also referred to herein as ending fuel burn) at the end of the delivery. In this regard, the ECM 245 may subtract the ending miles from the beginning miles to obtain the miles traveled for the delivery and may subtract the ending fuel burn from the beginning fuel burn to obtain the fuel burned for the delivery. As such, the ECM 245 may divide the miles traveled for the delivery by the fuel burned for the delivery to obtain the miles per gallon (MPG) for the vehicle (e.g., vehicle 100). The ECM 245 may utilize the calculated miles per gallon, in part, to determine the carbon emissions of a vehicle (e.g., vehicle 100), as described more fully below.

In an alternative example embodiment, the ECM 245 may determine the miles (e.g., for a vehicle transporting items for delivery) by reading a number of pulses from one or more speed sensors of the vehicle (e.g., vehicle 100). Based on the data of the number of pulses, the ECM 245 may determine from vehicle manufacturer data, the number of miles per identified pulses to obtain the total miles for a delivery, for example. Additionally, in an alternative example embodiment, the ECM 245 may determine the fuel burned for a vehicle (e.g., vehicle 100) by determining the number of injectors of the vehicle that open and close, times a fuel burn constant that the manufacturer provides, times a pulse width modulation of the injectors. In this regard, the ECM 245 may determine miles per gallon in this alternative example embodiment based on dividing the total miles for the delivery obtained by the identified pulses from the miles per gallon associated with the injectors opening and closing.

The number of injectors opening and closing may be determined by the ECM 245 during an ignition on to ignition off time period. In addition to determining the number of opening and closes of an injector(s), the ECM 245 may also determine how long (e.g., a number of milliseconds (ms)) the injector(s) was opened. At least one of the memory modules 210 may store data from the vehicle manufacturer indicating how many gallons or liters of fuel is burned per length of time that an injector(s) is open and the ECM 245 may utilize this data along with the determined number of openings and closings of the injectors to determine the fuel burned.

b. Exemplary Server

Figure 3:
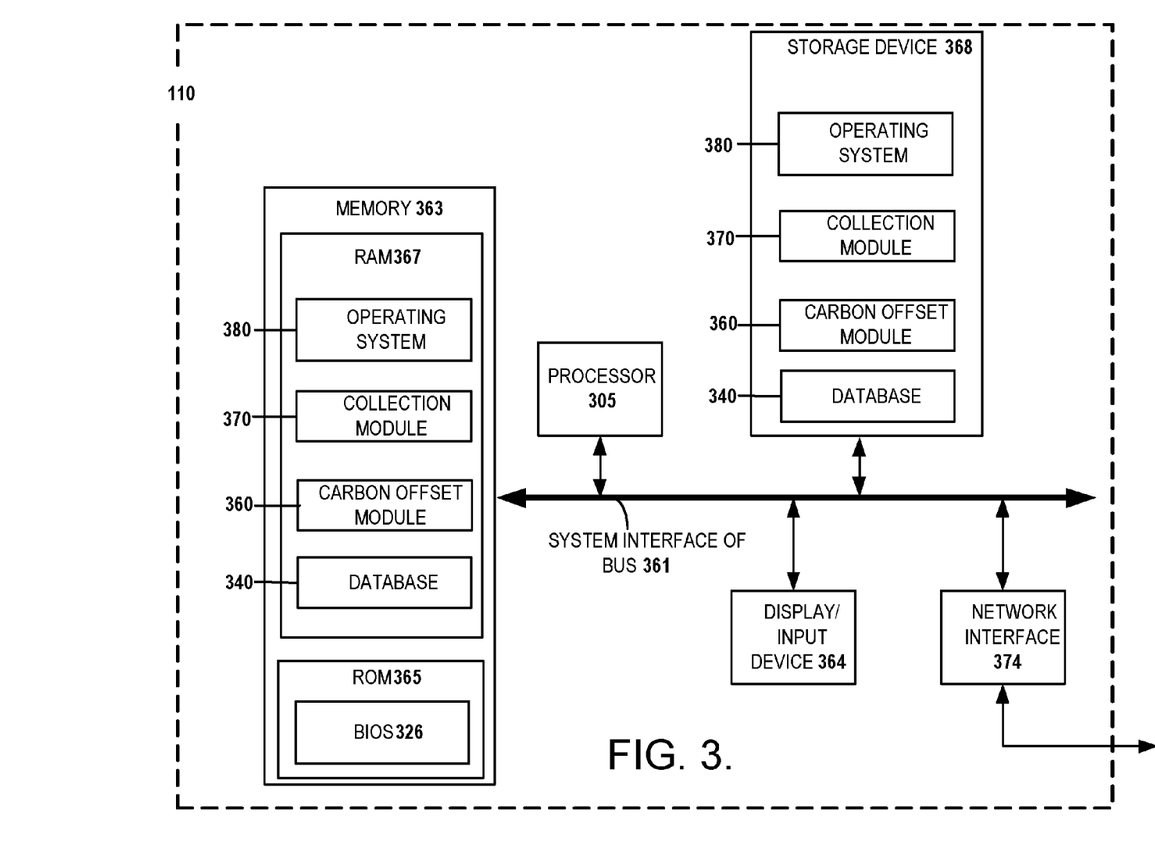
FIG. 3 is a schematic diagram of a server in accordance with certain example embodiments of the invention.

FIG. 3 provides a schematic of a server 110 according to one embodiment of the present invention. In general, the term "server" may refer to, for example, any computer, computing device, mobile phone, desktop, notebook or laptop, distributed system, server, blade, gateway, switch, distributed system, processing device, or combination of processing devices adapted to perform the functions described herein. As will be understood from this figure, in one embodiment, the server 110 may include a processor 305 that communicates with other elements within the server 110 via a system interface or bus 361. The processor 305 may be embodied in a number of different ways. For example, the processor 305 may be embodied as one or more processing elements, one or more microprocessors with accompanying digital signal processors, one or more processors without an accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention when configured accordingly. A display device/input device 364 for receiving and displaying data may also be included in or associated with the server 110. The display device/input device 364 may be, for example, a keyboard or pointing device that is used in combination with a monitor. The server 110 may further include transitory and non-transitory memory 363, which may include both random access memory (RAM) 367 and read only memory (ROM) 365. The server's ROM 365 may be used to store a basic input/output system (BIOS) 326 containing the basic routines that help to transfer information to the different elements within the server 110.

In addition, in one embodiment, the server 110 may include at least one storage device 368, such as a hard disk drive, a CD drive, a DVD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 368 may be connected to the system bus 361 by an appropriate interface.

Furthermore, a number of program modules may be stored by the various storage devices 368 and/or within RAM 367. Such program modules may include an operating system 380, a collection module 370 and a carbon offset module 360. As discussed in greater detail below, these modules may control certain aspects of the operation of the server 110 with the assistance of the processor 305 and operating system 380—although their functionality need not be modularized. In addition to the program modules, the server 110 may store and/or be in communication with one or more databases, such as database 340.

Also located within and/or associated with the server 110, in one embodiment, is a network interface 374 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the server 110 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the server's 110 components may be located remotely from other server 110 components. Furthermore, one or more of the components may be combined and additional components performing functions described herein may be included in the server 110.

c. Exemplary Portable Device

Figure 4:
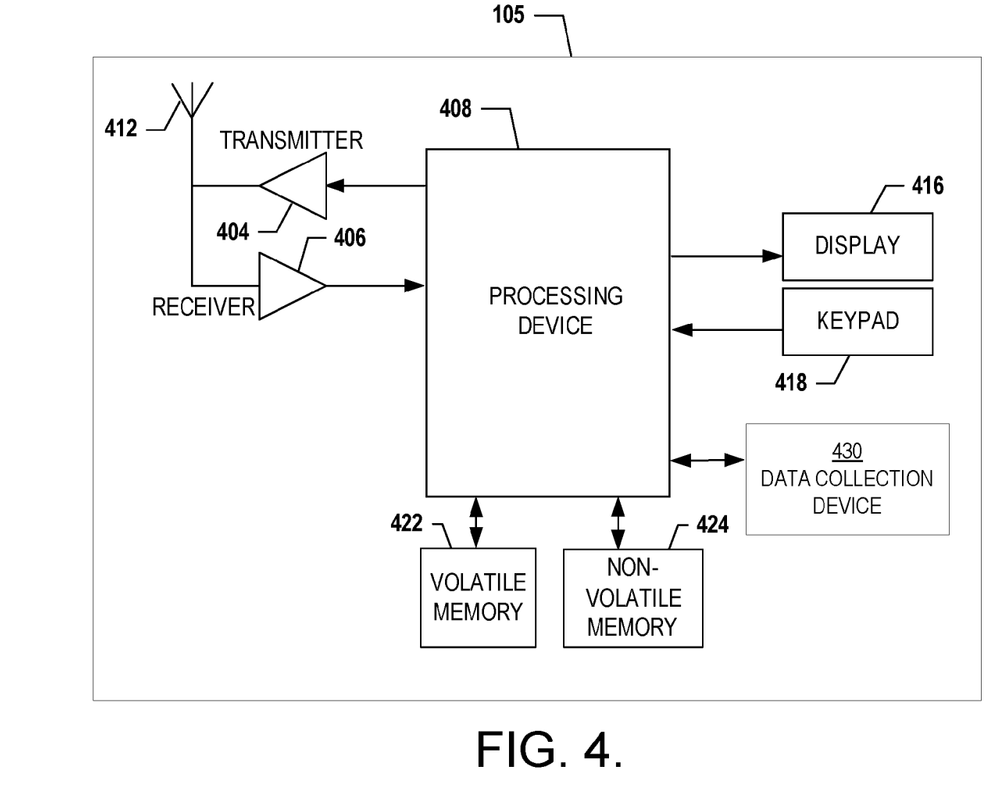
FIG. 4 is a schematic block diagram of a portable device in accordance with certain example embodiments of the invention.

With respect to the portable device 105, FIG. 4 provides an illustrative schematic representative of a portable device 105 that can be used in conjunction with the embodiments of the present invention (e.g., a portable device 105 may be used by a driver of each vehicle 100). As shown in FIG. 4, the portable device 105 can include an antenna 412, a transmitter 404, a receiver 406, a data collection device 430 (e.g., data collection device 130), and a processing device 408, e.g., a processor, controller, and/or the like, that provides signals to and receives signals from the transmitter 404 and receiver 406, respectively. The data collection device 430 may include an ECM (e.g., ECM 245).

The signals provided to and received from the transmitter 404 and the receiver 406, respectively, may include signaling information in accordance with an air interface standard of applicable wireless (or wired) systems. In this regard, the portable device 105 may be capable of operating with one or more air interface standards, communication protocols, modulation types, and access types. More particularly, the portable device 105 may operate in accordance with any of a number of second-generation (2G) communication protocols, third-generation (3G) communication protocols, and/or the like. Further, for example, the portable device 105 may operate in accordance with any of a number of different wireless networking techniques, such as GPRS, UMTS, CDMA2000, WCDMA, TD-SCDMA, LIE, E-UTRAN, Wi-Fi, WiMAX, UWB, and/or any other wireless protocol. Via these communication standards and protocols, the portable device 105 can communicate with the server 110 and/or various other entities.

The portable device 105 may also comprise a user interface (that can include a display 416 coupled to a processing device 408) and/or a user input interface (coupled to the processing device 408). The user input interface can comprise any of a number of devices allowing the portable device 105 to receive data, such as a keypad 418, a touch display (not shown), barcode reader (not shown), RFID tag reader (not shown), and/or other input device. In one embodiment including a keypad 418, the keypad 418 can include the conventional numeric (0-9) and related keys (#, *), and other keys used for operating the portable device 105 and may include a full set of alphabetic keys or set of keys that may be activated to provide a full set of alphanumeric keys. In addition to providing input, the user input interface can be used, for example, to activate and/or deactivate certain functions, such as screen savers and/or sleep modes. Although not shown, the portable device 105 may also include a battery, such as a vibrating battery pack, for powering the various circuits that are required to operate the portable device 105, as well as optionally providing mechanical vibration as a detectable output.

The portable device 105 can also include volatile memory 422 and/or non-volatile memory 424, which can be embedded or may be removable. For example, the non-volatile memory may be embedded or removable MMCs, SD memory cards, Memory Sticks, EEPROM, flash memory, hard disk, and/or the like. The memory can store any of a number of pieces or amount of information and data used by the portable device 105 to implement the functions of the portable device 105. The memory can also store content, such as computer program code for an application and/or other computer programs.

The portable device 105 may also include a GPS module adapted to acquire, for example, latitude, longitude, altitude, geocode, course, speed, universal time (UTC), date, and/or telematics information/data. In one embodiment, the GPS module acquires data, sometimes known as ephemeris data, by identifying the number of satellites in view and the relative positions of those satellites. In addition, data regarding, for example, heading and estimated time of arrival (ETA) can also be captured, which enhances the determination of the position of the GPS module.

II. Exemplary System Operation

Figure 6:
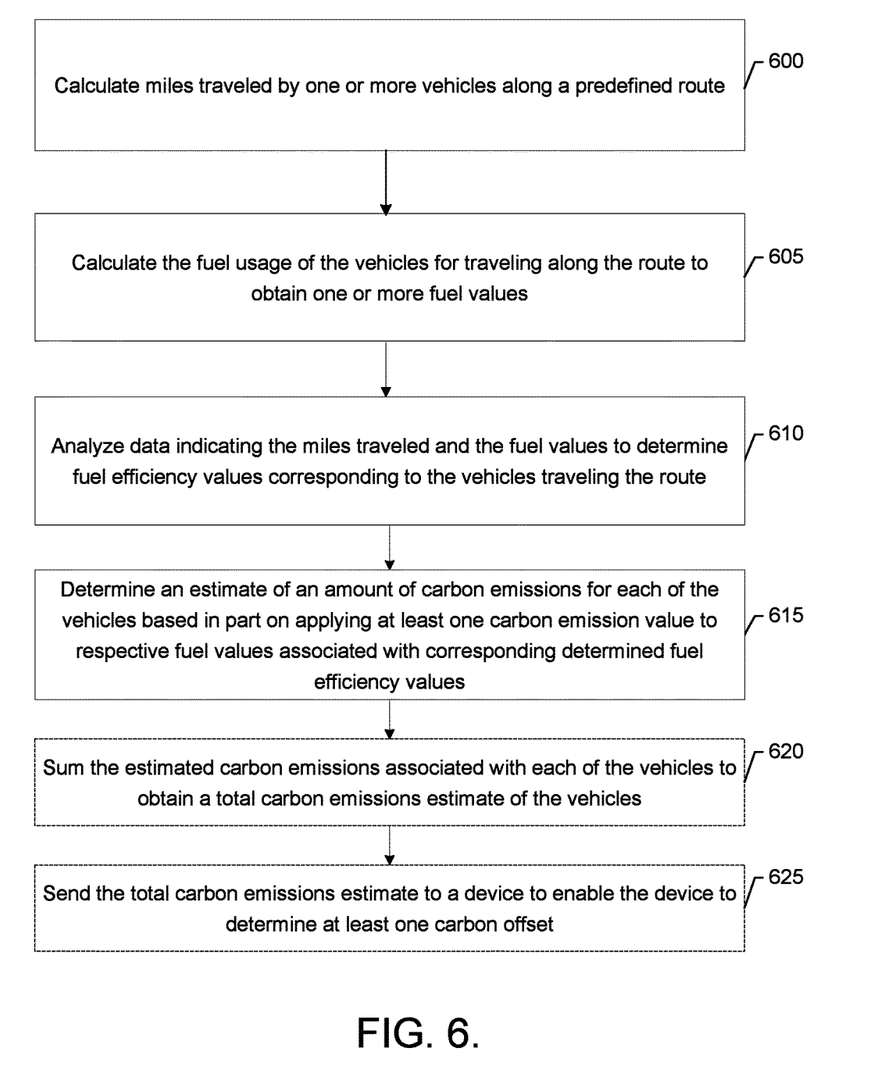
FIG. 6 is a flowchart illustrating operations and processes that can be used in accordance with various example embodiments of the invention.

Reference will now be made to an example embodiment of a system for enabling determination of carbon emissions of vehicles. In this regard, FIG. 5 illustrates total carbon emissions estimated for a fleet of vehicles. FIG. 6 illustrates operations and processes that may be performed for determining carbon emissions of vehicles according to an example embodiment of the invention.

The following examples may be described in the context of a fleet of delivery vehicles as the delivery vehicles travel or traverse respective delivery areas along a route. As will be recognized, though, embodiments of the present invention are not limited to such examples.

a. Collection of Data for Determining Carbon Emissions

In one embodiment, a computing entity (e.g., the data collection device 130, portable device 105) may be configured to collect/obtain/receive/store data (e.g., telematics data) that may be utilized to determine the miles per gallon of a vehicle and/or a fleet of vehicles and the miles per gallon information may be utilized in part to determine the carbon emissions of the vehicle and/or the fleet of vehicles.

As described above, the ECM 245 of the data collection device 130 may determine the miles per gallon of a vehicle (e.g., vehicle 100) based in part on analyzing SPN codes 245 and 250 and data associated with the SPN codes 245 and 250. The SPN codes 245, 250 may be received by the ECM 245 from the ECU 243. The SPN code 245 may be associated with data indicating the current miles of a vehicle and the SPN code 250 may be associated with data indicating the current fuel burn of the vehicle. In one example embodiment, the SPN codes 245, 250 and associated data may be provided to the ECM 245 by the ECU 243 in response to receipt of an indication of a start of a route (e.g., the vehicle leaving a starting location) and another receipt of an indication of an end of a route (e.g., the vehicle reaching an ending location). The indications may, but need not, be received by the ECM 245 based in part on a selection by the driver of the vehicle.

The ECU 243 may provide a SPN codes 245 and associated data and a SPN code 250 and associated data to the ECM 245 in response to detection of the vehicle (e.g., vehicle 100) leaving a starting location associated with a GPS coordinate(s) (e.g., a longitude coordinate, a latitude coordinate, etc.) corresponding to a route (a predefined route (e.g., a delivery route)). In one example embodiment, the vehicle 100 may deliver one or more packages to one or more entities along the route. The SPN code 245 and associated data may relate to information indicating the current mileage over the lifetime of the vehicle as detected, by the ECU 243, upon the vehicle leaving the starting location. The SPN code 250 and associated data may relate to information indicating the current fuel over the lifetime of the vehicle as detected, by the ECU 243, upon the vehicle leaving the starting location. Additionally, the ECU 243 may provide additional SPNs codes 245 and 250 and associated data to the ECM 245 upon detection of a GPS coordinate(s) (e.g., a longitude coordinate, a latitude coordinate, etc.) signifying the end of the route. The additional SPN code 245 and associated data may relate to information indicating the current mileage over the lifetime of the vehicle as detected, by the ECU 243, upon the vehicle entering the ending location (e.g., a destination location) of a route. In addition, the additional SPN code 250 and associated data may relate to information indicating the current fuel over the lifetime of the vehicle as detected, by the ECU 243, upon the vehicle entering the ending location of the route. In one example embodiment, the starting location of the route may be the same as the ending location. In other alternative example embodiments, the starting location and the ending location may be different.

The ECM 245 may subtract the total miles detected at the end of the route from the total miles detected at the beginning of the route to determine the total miles, traveled by the vehicle, for the route. The ECM 245 may also subtract the total fuel burn determined at the end of the route from the total fuel burn detected at the beginning of the route to determine the total fuel burn, of the vehicle, for the route. In this manner, the ECM 245 may divide the total miles for the route by the total fuel burn for the route to obtain the miles per gallon for the vehicle. The ECM 245 may utilize the data (e.g., the total fuel burn) associated with determining the miles per gallon to determine the carbon emissions (e.g., $CO_2$ emissions) of the vehicle, as described more fully below.

In some other alternative example embodiments, the ECM 245 of the data collection device 130 may determine the miles per gallon of a vehicle (e.g., vehicle 100) based in part on analyzing data associated with a number of injectors (e.g., fuel injectors) that open and close during a time period (e.g., an ignition on/off period, a time period associated with completion of a predefined route, etc.) to obtain the total fuel burn of a vehicle for a route. Additionally, the ECM 245 may determine the number of pulses detected from a speed sensor to determine the total miles traveled for a route, in a manner analogous to that described above. In this regard, the ECM 245 may divide the total miles by the total fuel burned to determine the miles per gallon for the vehicle. The ECM 245 may utilize the data (e.g., the total fuel burned) associated with determining the miles per gallon to determine the carbon emissions (e.g., $CO_2$ emissions) of the vehicle, as described more fully below.

In an instance in which the ECM 245 determines the carbon emissions for a vehicle and/or a fleet of vehicles, the ECM 245 may send the determined carbon emissions data to the server 110 (e.g., also referred to herein as a carbon emissions and offset server 110). Based in part on a determined estimate of carbon emissions received by the server 110, the processor 305 of the server 110 may send a message to the ECM 245 and/or the portable computing device 105 indicating a carbon offset determined based in part on the carbon emissions. In one example embodiment, in an instance in which the processor 305 of the server 110 determines that the carbon offset exceeds a predetermined threshold, the server 110 may include data in the message indicating a cost to be paid to a carbon emissions and offset entity for exceeding the threshold. In some example embodiments, the server 110 may execute the collection module 370 to generate and facilitate sending of the message to the ECM 245 and/or the portable computing device 105 as well as for determining whether the carbon offset exceeds the predetermined threshold. In some example embodiments, the carbon emissions and offset entity may maintain the server 110. However, in some alternative example embodiments, the carbon emissions and offset entity may not maintain the server 110.

b. Collection of Data Affecting Carbon Emissions

In an example embodiment, the ECM 245 may determine that the fuel efficiency with respect to the determined miles per gallon of a vehicle(s) and/or a fleet of vehicles may affect the carbon emissions (e.g., $CO_2$ emissions) of the vehicle(s) and/or the fleet of vehicles. For instance, the ECM 245 may, but need not, determine that a more efficient miles per gallon value of a vehicle may result in lower carbon emissions whereas a less efficient miles per gallon value of a vehicle may result in a higher carbon emissions.

i. Collection of Telematics Data

In one example embodiment, a computing entity (e.g., the data collection device 130, portable device 105) may be configured to collect/obtain/receive/store telematics data that may be utilized in part to determine fuel efficiency of a vehicle(s) (e.g., vehicle 100) which may affect one or more carbon emissions calculations of the vehicle(s) and/or a fleet of vehicles.

In an instance in which the vehicle sensors 125 of the data collection device 130 detect one or more fault codes, the vehicle sensors 125 may provide the fault codes to the ECM 245 and the ECM 245 may analyze the data associated with the fault codes to determine whether one or more faults associated with the fault codes may affect the fuel efficiency of a vehicle. The fault codes may be generated by the vehicle sensors 125 upon detecting a malfunction or abnormal condition of one or more parts of a vehicle (e.g., vehicle(s) 100).

For instance, in an instance in which the vehicle sensors 125 receive an indication of an anti-lock braking system (ABS) fault code, the vehicle sensors 125 may provide this data to the ECM 245 and the ECM 245 may determine that the vehicle(s) may obtain a lower than normal or less desirable fuel efficiency for the vehicle (for example, for a given route).

In one example embodiment, the vehicle sensors 125 may trigger a fault code associated with the ABS based in part on determining that a tire(s) is turning a certain amount of rotations per mile and that the rotations of the tire(s) is off by a predetermined amount or number of rotations per mile.

The ECM 245 may determine that the vehicle may achieve a lower fuel efficiency upon detection of an ABS fault code (e.g., breaking code 136) since transmission of the vehicle may be unable to enter a full lockout mode. For instance, in an instance in which the vehicle sensors 125 detects an ABS fault code and provides this data to the ECM 245, the ECM 245 determines that there is a problem with the brakes and as such the vehicle 100 may be unable to enter into overdrive associated with the transmission (e.g., an automatic transmission). In this regard, the ECM 245 may determine that the vehicle is unable to achieve desirable fuel efficiency with anti-lock brakes improperly working because the transmission may be unable to allow itself to achieve overdrive, even at reduced speeds. The ECM 245 may determine that the lower than desirable fuel efficiency may result in a lower miles per gallon, which may ultimately result in an increase in the carbon emissions of the vehicle.

The vehicle sensors 125 may also detect other codes which may indicate a malfunction or abnormal/improper usage (for example, improper driver behavior) of one or more parts of the vehicle. For instance, in an example embodiment the vehicle sensors 125 may detect or receive one or codes indicating that the engine is trying to protect itself from over speed, or that the transmission is trying to protect itself from shifting to early because a driver is improperly using the vehicle. In this regard, in an instance in which a driver is utilizing the vehicle improperly such as, for example, speeding, revving up the engine, etc. the vehicle sensors 125 may detect a transmission code such as, for example, a shift inhibit code, an engine over speed code, or any other suitable code(s), detected by the vehicle sensors. The vehicle sensors 125 may notify the ECM 245 of the code(s). In response to receipt of the code(s) by the ECM 245, the ECM 245 may instruct the engine of the vehicle to protect itself and may set a value for a lower revolutions per minute (RPM) to prevent the engine from being damaged. In response to receipt of the code(s) (e.g., a shift inhibit code) from the ECM 245, the engine may decrease the RPM for a predetermined time period to enable the vehicle to slow down.

In an example embodiment, the ECM 245 may determine that the fuel efficiency of the vehicle is lower than desired upon receipt of a code(s) that may be triggered based in part on improper driver behavior such as, for example, the shift inhibit code and/or the engine over speed code. For example, the ECM 245 may determine that the vehicle is unable to perform optimally which may undesirably affect the fuel efficiency in an instance in which the shift inhibit code and/or the engine over speed code is triggered since the engine may protect itself from shifting a transmission gear(s) too early for example and/or may set a lower RPM value when these codes are triggered. As such, the ECM 245 may determine or estimate that a carbon emissions measurement for the vehicle may be higher than normal in response to detection of a code(s) (e.g., a shift inhibit code and/or the engine over speed code) denoting improper driver behavior.

iii. Geofence-Based Collection

In one embodiment, a computing entity (e.g., the data collection device 130, portable device 105, and/or server 110) may use geofences to collect/obtain/receive/store telematics data. For example, a computing entity may be used to define geofences around geographic areas, such as around countries, regions, states, counties, cities, towns, interstates, roads, streets, avenues, toll roads, ways, exit and entrance ramps, pickup/delivery routes, bus routes, taxis routes, industrial parks, neighborhoods, parking lots, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic areas. The geographic areas, and therefore the geofences, may be any shape including, but not limited to, circles, squares, rectangles, irregular shapes, and/or the like. Moreover, the geofenced areas need not be the same shape or size. Accordingly, any combination of shapes and sizes may be used in accordance with embodiments of the present invention. Similarly, a geofence may overlap or reside wholly within another geofence. A geofence may be as large as an entire country, region, state, county, city, or town (or larger).

In one embodiment, once at least one geofence has been defined, the coordinates (or similar methods for defining the geofenced areas) may be stored in a database associated with, for example, a data collection device 130, portable device 105, and/or server 110. After the one or more geofenced areas (e.g., geofences) have been defined, the location of a vehicle 100 can be monitored. Generally, the location of the vehicle 100 can be monitored by any of a variety of computing entities, including the data collection device 130, portable device 105, and/or server 110. For example, as noted above, a vehicle's 100 location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (a data collection device 130, portable device 105, and/or server 110) can determine, for example, when the vehicle 100 enters and/or exits a defined geofence. Entering and/or exiting a geofenced area may cause a computing entity to collect/obtain/receive/store telematics data. Additionally or alternatively, a computing entity may regularly, periodically, and/or continuously collect/obtain/receive/store telematics data once inside and/or outside a particular geofenced area.

In one example embodiment, the ECM 245 of the data collection device 130 may detect the entering of a geofenced area associated with a starting location of a route. In this regard, detection of the entering of the geofenced area associated with the starting location may trigger the ECM 245 to determine the current miles and the current fuel burn of a vehicle (e.g., vehicle 100) at the time of entering the geofenced area (e.g., at the starting location). Additionally, upon detection of the vehicle exiting the geofenced area, which may be associated with an ending location of a route, the ECM 245 may determine the current miles and the current fuel burn of the vehicle at the time of exiting the geofenced area (e.g., the ending location or destination location). In this regard, the ECM 245 may subtract the current miles at the exit of the geofenced area (e.g., the ending/destination location) from the current miles at entering of the geofenced area (e.g., the starting location) to determine the total miles for the route. In addition, the ECM 245 may subtract the current fuel burn detected at the exit of the geofenced area (e.g., at the ending/destination location) from the current fuel burn detected at the entering of the geofenced area (e.g., at the starting location) to obtain the total fuel burn for the route. The ECM 245 may determine the miles per gallon for the vehicle by dividing the total miles traveled for the route by the total fuel burn for the route. The ECM 245 may determine an estimate of the carbon emissions of the vehicle based in part on applying a carbon emissions constant to data (e.g., the total fuel burn) associated with calculating the miles per gallon, as described more fully below.

Referring now to FIG. 5, a diagram of a user interface illustrating carbon emissions of vehicles according to an example embodiment is provided. The user interface 7 of the example embodiment of FIG. 5 may be generated by an ECM. In an example embodiment, an ECM (e.g., ECM 245) of a data collection device 430 of the portable device 105 may generate the user interface 7. The ECM of the data collection device 430 may generate the user interface 7 in response to receiving telematics data (e.g., vehicle numbers, model years of vehicles, a body type of vehicles, GPS mileage data, engine type data, mileage data, amounts of fuel burned for traveling along one or more routes or within one or more locations, etc.) from data collection devices 130 of vehicles 100 (e.g., a fleet of vehicles).

In this regard, the user interface 7 may include data indicating the carbon emissions for one or more vehicles 5 (e.g., vehicle 100), for example, a fleet of vehicles 5. The data indicating the carbon emissions of one or more vehicles 5 may be provided by the ECM in a report in response to receipt of an indication of a reports tab 3. In this regard, in response to receipt of a selection of the engine type (e.g., CUMMINS ISB-07), the ECM 245 may calculate carbon emissions for the same engine type over a variety of different vehicles and may include visible indicia in the user interface 7 indicating the calculated carbon emissions for the same engine type. In some example embodiments, the ECM 245 may calculate carbon emissions for different engine types and may include visible indicia in the user interface 7 indicating the calculated carbon emissions for the different engine types. The different vehicles 5 (e.g., vehicle 142921, vehicle 147163, etc.) may, but need not, correspond to different model years (e.g., 2008, 2009, etc.) and may have a different body (e.g., P100D, P70D, etc.) or make.

In the example embodiment of FIG. 5, the ECM 245 may include visible indicia in user interface 7 indicating a selection of a location (e.g., location FLPIN) or a same route in which to determine the carbon emissions for the selected vehicles 5. In this regard, the miles per gallon (e.g., 389.91 miles/33.16 fuel=11.76 MPG) of one or more vehicles 5 (e.g., vehicle 142921) traveling within the selected location (e.g., FLPIN) or along a selected route may be evaluated and calculated by the ECM 245. As such, the data indicating the calculated miles per gallons for vehicles 5 traveling within the selected location or along the same route may be included by the ECM 245 in the user interface 7. The ECM 245 may also calculate the average (avg) miles (e.g., 389.91 miles/6 days=64.99 avg. miles) traveled by one or more of the selected vehicles 5 (e.g., vehicle 142921) for the selected location and/or the selected route and may include visible indicia indicating the average miles in the user interface 7. Additionally, the ECM 245 may calculate the average fuel (e.g., 33.16 fuel/6 days=5.53 avg. fuel) used by one or more of the selected vehicles 5 (e.g., vehicle 142921) traveling within the selected location and/or the selected route and may include visible indicia indicating the average fuel in the user interface 7.

In the example embodiment of FIG. 5, the ECM 245 may include visible indicia in the user interface 7 indicating the carbon emissions calculated for selected vehicles 5. In one example embodiment, the ECM 245 may include the visible indicia in the user interface 7 in response to the ECM 245 determining the carbon emissions for one or more of the selected vehicles 5 (e.g., vehicle 142921) traveling within the selected location or along the selected route. The ECM 245 may determine the carbon emissions based in part on a determined total fuel burn (e.g., 33.16 gallons) value being applied to one or more constants (e.g., a carbon emissions factor/value(s)) to obtain the carbon emissions (for example, in pounds (lbs.) (e.g., 741.96 lbs.) and/or tons (e.g., 0.34 tons)) for a corresponding selected vehicle(s) (e.g., vehicle 142921). The total fuel burn may be determined by the ECM 245 in calculating the miles per gallon (e.g., 11.76 MPG) of a selected vehicle for a route.

In an example embodiment, in an instance in which the vehicles 5 (e.g., vehicle 142921, vehicle 147163), identified in the user interface 7, utilize diesel fuel, the ECM 245 may utilize equation (1) as follows to calculate carbon emissions such as, for example, $CO_2$ emissions:

$$\text{dieselKgpergallon} \times \text{kgTolbs} \times \text{fuel} \qquad (1),$$

where dieselKgpergallon corresponds to a $CO_2$ emission factor (also referred to herein as $CO_2$ emission value or $CO_2$ emission constant) of 10.15 for a diesel fuel type, and kgTolbs corresponds to a kilogram to pounds conversion value of 2.20462262. As such, for purposes of illustration and not of limitation, in an instance in which the ECM 245 determines that vehicle 142921 utilizes 33.16 gallons of diesel fuel, the ECM 245 may utilize equation (1) to determine that the carbon emissions for vehicle 142921, for a particular route, is 741.96 $CO_2$ lbs. (e.g., 10.15× 2.20462262×33.16=741 $CO_2$ lbs). The ECM 245 may convert the 741 $CO_2$ lbs. to 0.34 $CO_2$ tons. As another example, for purposes of illustration and not of limitation, in an instance in which the ECM 245 determines that vehicle 147163 utilizes 40.55 gallons of diesel fuel for a route, the ECM 245 may utilize equation (1) to determine that the carbon emissions for vehicle 147163 is 907.49 $CO_2$ lbs (e.g., 10.15×2.20462262×40.55≅907 $CO_2$ lbs.). The ECM 245 may convert the 907 $CO_2$ lbs. to ≅=0.41 $CO_2$ tons.

In another example embodiment, in an instance in which one or more vehicles utilize other types of fuel, the ECM 245 may utilize other equations to determine the carbon emissions for one or more vehicles. For example, in an instance in which one or more vehicles utilize gas (e.g., petroleum) fuel, the ECM 245 may utilize equation (2) as follows to calculate carbon emissions such as, for example, $CO_2$ emissions:

$$\text{gasKgpergallon} \times \text{kgTolbs} \times \text{fuel} \quad (2),$$

where gasKgpergallon corresponds to a $CO_2$ emission value of 8.81 for a gas (e.g., petroleum) fuel type, and kgTolbs corresponds to a kilogram to pounds conversion value of 2.20462262, the fuel corresponds to the fuel used/burned by the corresponding vehicle (e.g., for a selected route).

In an example embodiment, the ECM 245 may total all the carbon emissions for each of the selected vehicles 5 to obtain a total carbon emissions (e.g., a carbon footprint) for the fleet of vehicles 5. In this regard, the ECM 245 may provide an estimate of the total pounds of carbon dioxide emitted (e.g., a total of the ECM $CO_2$ (lbs) 9) for the fleet of vehicles 5 and the total metric tons of carbon dioxide emitted (e.g., a total of the ECM $CO_2$ (tons) 11) for the fleet of vehicles 5 to a carbon emissions and offset entity server 110. In this regard, the processor 305 of the carbon emissions and offset entity server 110 may execute a carbon offset module 360 to determine the carbon offset for the fleet of vehicles 5 based on an estimate of the total carbon emissions received, from the ECM 245, for the fleet of vehicles. In some example embodiments, in an instance in which the carbon offset is above a predetermined threshold, the carbon emissions and offset entity server 110 may determine a carbon price or a carbon tax to charge an entity maintaining the fleet of vehicles for carbon usage in excess of the predetermined threshold.

Referring now to FIG. 6, an example embodiment of a flowchart for calculating carbon emissions of one or more vehicles is provided. At operation 600, an apparatus (e.g., portable device 105) may calculate miles traveled by the vehicles (e.g., vehicles 100) along a predefined route or path. At operation 605, an apparatus (e.g., portable device 105) may calculate the fuel usage (e.g., fuel burned) of the vehicles for traveling along the route to obtain one or more fuel values (e.g., total fuel burned for the route/path). At operation 610, an apparatus (e.g., portable device 105) may analyze the miles traveled and the fuel values to determine fuel efficiency values (e.g., miles per gallon (MPG) values) corresponding to the vehicles traveling the route.

At operation 615, an apparatus (e.g., portable device 105) may determine an estimate of an amount of carbon emissions (e.g., $CO_2$ emissions) for each of the vehicles based in part on applying at least one carbon emission value to respective fuel values (e.g., total fuel burned for the route/path) associated with corresponding determined fuel efficiency values (e.g., MPG values). In one example embodiment, the apparatus may estimate the carbon emissions in pounds and/or tons of $CO_2$. Optionally, at operation 620, an apparatus (e.g., portable device 105) may sum the estimated carbon emissions associated with each of the vehicles to obtain a total carbon emissions estimate of the vehicles (e.g., a fleet of vehicles). Optionally, at operation 625, an apparatus (e.g., portable device 105) may send the total carbon emissions estimate to a device (e.g., server 110) to enable the device to determine at least one carbon offset. The carbon offset may, but need not, be associated with an amount of money owed to a carbon emissions and offset entity for emitting the carbon emissions.

It should be pointed out that FIG. 6 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory modules 210, memory 363, storage device 368, volatile memory 422, non-volatile memory 424) and executed by a processor (e.g., controller(s) 240, ECM 245, processor 305, processing device 408). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 6 above may comprise a processor (e.g., controller(s) 240, ECM 245, processor 305, processing device 408) configured to perform some or each of the operations (600-625) described above. The processor may, for example, be configured to perform the operations (600-625) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-625) may comprise, for example, the controller(s) 240 (e.g., a processor) (e.g., as means for performing any of the operations described above), the ECM 245, processor 305, processing device 408 and/or a device or circuitry for executing instructions or executing an algorithm for processing information as described above.

III. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    calculating a fuel usage of a plurality of vehicles for traveling along a predefined route to obtain one or more fuel values;
    analyzing data indicating miles traveled by the vehicles along the route and the fuel values to determine fuel efficiency values corresponding to the vehicles traveling the route;
    determining, via a processor, an estimate of an amount of carbon emissions for each of the vehicles; and
    receiving an indication, from a device, of at least one carbon offset determined based in part on a total carbon emissions estimate of each of the vehicles, that traveled the route during a predetermined time period, in response to sending the total carbon emissions estimate to the device, the carbon offset denotes whether the total carbon emissions estimate exceeds an acceptable level of carbon emissions.

2. The method of claim 1, wherein the fuel efficiency values comprise miles per gallon values of the respective vehicles determined for traveling the route.

3. The method of claim 1, wherein prior to receiving the indication, the method further comprises:
    summing the estimated carbon emissions associated with each of the vehicles to obtain the total carbon emissions estimate of the vehicles, and
    wherein sending the total carbon emissions estimate further comprises sending the total carbon emissions estimate to the device to enable the device to determine the at least one carbon offset.

4. The method of claim 2, further comprising:
    determining that at least one detected code reduces at least one of the fuel efficiency values associated with a corresponding vehicle, among the vehicles, that triggered the code, the code is associated with at least one malfunction of at least one part of the vehicle or abnormal driver behavior of a driver driving the vehicle along the route.

5. The method of claim 4, further comprising:
    determining that an estimate of an amount of carbon emissions for the vehicle is increased in response to receipt of an indication of the detected code.

6. The method of claim 4, wherein the code comprises at least one of a fault code of a braking system or a code associated with inhibiting shifting of a transmission or reducing a speed of the vehicle.

7. The method of claim 2, further comprising:
    calculating the miles in an instance in which the vehicles traverse a first location of a geofence corresponding to an origin of the route and traverse a second location corresponding to an end of the route by subtracting a detected amount of miles traveled by the vehicles as the vehicles traverse the second location from a detected amount of miles of the vehicles as the vehicles traverse the first location; and
    calculating the fuel values in response to the vehicles traversing the first location and the second location of the geofence by subtracting a detected amount of fuel used by the vehicles as the vehicles traverse the second location from a detected amount of fuel of the vehicles as the vehicles traverse the first location.

8. The method of claim 7, wherein the geofence comprises one or more latitude and longitude coordinates associated with defined points of a geographic area.

9. The method of claim 3, wherein:
    the received indication comprises indicia indicating a cost of money owed to an emissions and offset entity in response to the device determining that the carbon offset is above a predetermined threshold.

10. The method of claim 1, wherein the vehicles transport one or more packages for delivery along the route.

11. The method of claim 1, wherein prior to calculating the fuel usage, the method further comprises receiving an indication that an engine type of the vehicles is the same.

12. The method of claim 1, wherein:
    receiving the indication comprises receipt of indicia indicating a carbon tax charged by an emissions and offset entity in response to a determination that the carbon offset is above a predetermined threshold.

13. An apparatus comprising at least one processor and at least one memory including computer program code, the at least one memory and the computer program code configured to:
    calculate a fuel usage of a plurality of vehicles for traveling along a predefined route to obtain one or more fuel values;
    analyze data indicating miles traveled by the vehicles along the route and the fuel values to determine fuel efficiency values corresponding to the vehicles traveling the route;
    determine an estimate of an amount of carbon emissions for each of the vehicles; and
    receive an indication, from a device, of at least one carbon offset determined based in part on a total carbon emissions estimate of each of the vehicles, that traveled the route during a predetermined time period, in response to sending the total carbon emissions estimate to the device, the carbon offset denotes whether the total carbon emissions estimate exceeds an acceptable level of carbon emissions.

14. The apparatus of claim 13, wherein the fuel efficiency values comprise miles per gallon values of the respective vehicles determined for traveling the route.

15. The apparatus of claim 13, wherein prior to receive the indication, the memory and computer program code are further configured to, with the processor, cause the apparatus to:
    sum the estimated carbon emissions associated with each of the vehicles to obtain the total carbon emissions estimate of the vehicles; and
    perform the sending by sending the total carbon emissions estimate to the device to enable the device to determine the at least one carbon offset.

16. The apparatus of claim 14, wherein the memory and computer program code are further configured to, with the processor, cause the apparatus to:

determine that at least one detected code reduces at least one of the fuel efficiency values associated with a corresponding vehicle, among the vehicles, that triggered the code, the code is associated with at least one malfunction of at least one part of the vehicle or abnormal driver behavior of a driver driving the vehicle along the route.

17. The apparatus of claim 16, wherein the memory and computer program code are further configured to, with the processor, cause the apparatus to:
determine that an estimate of an amount of carbon emissions for the vehicle is increased in response to receipt of an indication of the detected code.

18. The apparatus of claim 16, wherein the code comprises at least one of a fault code of a braking system or a code associated with inhibiting shifting of a transmission or reducing a speed of the vehicle.

19. The apparatus of claim 14, wherein the memory and computer program code are further configured to, with the processor, cause the apparatus to:
calculate the miles in an instance in which the vehicles traverse a first location of a geofence corresponding to an origin of the route and traverse a second location corresponding to an end of the route by subtracting a detected amount of miles traveled by the vehicles as the vehicles traverse the second location from a detected amount of miles of the vehicles as the vehicles traverse the first location; and
calculate the fuel values in response to the vehicles traversing the first location and the second location of the geofence by subtracting a detected amount of fuel used by the vehicles as the vehicles traverse the second location from a detected amount of fuel of the vehicles as the vehicles traverse the first location.

20. The apparatus of claim 19, wherein the geofence comprises one or more latitude and longitude coordinates associated with defined points of a geographic area.

21. The apparatus of claim 15, wherein:
the received indication comprises indicia indicating a cost of money owed to an emissions and offset entity in response to the device determining that the carbon offset is above a predetermined threshold.

22. The apparatus of claim 13, wherein the vehicles transport one or more packages for delivery along the route.

23. The apparatus of claim 13, wherein prior to calculate the fuel usage, the memory and computer program code are further configured to, with the processor, cause the apparatus to:
receive an indication that an engine type of the vehicles is the same.

24. The apparatus of claim 13, wherein the memory and computer program code are further configured to, with the processor, cause the apparatus to:
receive the indication by receiving indicia indicating a carbon tax charged by an emissions and offset entity in response to a determination that the carbon offset is above a predetermined threshold.

25. A computer program product comprising at least one non-transitory computer-readable storage medium having computer-executable program code instructions stored therein, the computer-executable program code instructions comprising:
program code instructions configured to calculate a fuel usage of a plurality of vehicles for traveling along a predefined route to obtain one or more fuel values;
program code instructions configured to analyze data indicating miles traveled by the vehicles along the route and the fuel values to determine fuel efficiency values corresponding to the vehicles traveling the route;
program code instructions configured to determine an estimate of an amount of carbon emissions for each of the vehicles; and
program code instructions configured to cause receipt of an indication, from a device, of at least one carbon offset determined based in part on a total carbon emissions estimate of each of the vehicles, that traveled the route during a predetermined time period, in response to sending the total carbon emissions estimate to the device, the carbon offset denotes whether the total carbon emissions estimate exceeds an acceptable level of carbon emissions.

26. The computer program product of claim 25, wherein the fuel efficiency values comprise miles per gallon values of the respective vehicles determined for traveling the route.

27. The computer program product of claim 25, wherein prior to cause the receipt of the indication, the computer program product further comprises:
program code instructions configured to sum the estimated carbon emissions associated with each of the vehicles to obtain the total carbon emissions estimate of the vehicles, and
wherein sending the total carbon emissions further comprises sending of the total carbon emissions estimate to the device to enable the device to determine the at least one carbon offset.

28. The computer program product of claim 25, wherein:
the receipt of the indication comprises receipt of indicia indicating a carbon tax charged by an emissions and offset entity in response to a determination that the carbon offset is above a predetermined threshold.

* * * * *